US008078209B2

(12) United States Patent
Chowdhary et al.

(10) Patent No.: US 8,078,209 B2
(45) Date of Patent: Dec. 13, 2011

(54) METHOD AND DEVICE FOR CONTROLLING ACCESS TO A CHANNEL IN A CONVENTIONAL MULTI-SITE COMMUNICATION SYSTEM

(75) Inventors: Dipendra M. Chowdhary, Hoffman Estates, IL (US); John P. Belmonte, Schaumburg, IL (US); Sanjaykumar S. Karpoor, Buffalo Grove, IL (US); Hemant J. Patel, Bartlett, IL (US); David G. Wiatrowski, Woodstock, IL (US)

(73) Assignee: Motorola Solutions, Inc., Schaumburg, IL (US)

( * ) Notice: Subject to any disclaimer, the term of this patent is extended or adjusted under 35 U.S.C. 154(b) by 673 days.

(21) Appl. No.: 12/253,353

(22) Filed: Oct. 17, 2008

(65) Prior Publication Data

US 2010/0099420 A1    Apr. 22, 2010

(51) Int. Cl.
*H04Q 7/20* (2006.01)
(52) U.S. Cl. ......... 455/518; 455/519; 455/11.1; 455/7; 455/517; 455/507; 370/310; 370/315; 370/260; 370/261; 370/262
(58) Field of Classification Search .................. 455/518, 455/519, 500, 517, 7, 11.1, 24, 16, 422.1, 455/403, 507, 508, 509, 515, 550.1, 426.1, 455/426.2, 414.1–414.4; 370/310, 315, 328, 370/329, 260, 261, 262
See application file for complete search history.

(56) References Cited

U.S. PATENT DOCUMENTS

| 5,678,180 | A | * | 10/1997 | Mehta et al. | ............... 455/422.1 |
| 5,864,762 | A | | 1/1999 | Childress et al. | |
| 6,021,326 | A | * | 2/2000 | Nguyen | ..................... 455/422.1 |
| 6,781,971 | B1 | | 8/2004 | Davis et al. | |
| 2007/0160192 | A1 | * | 7/2007 | Horio et al. | ................... 379/338 |
| 2008/0132164 | A1 | | 6/2008 | Bugenhagen et al. | |

OTHER PUBLICATIONS

PCT International Search Report Dated May 6, 2010.

* cited by examiner

*Primary Examiner* — Keith Ferguson
(74) *Attorney, Agent, or Firm* — Valerie M. Davis; Daniel R. Bestor

(57) ABSTRACT

A repeater receives and repeats, on a multi-site channel, a sequence of control and media transmissions included in a session, wherein the session has a plurality of participants. While repeating these transmissions, the repeater further detects, from at least one of the transmissions, a start of the session and a type of the session. Based on the type of the session, the repeater determines whether to perform an arbitration during the session to control access to the multi-site channel, and restricts each performed arbitration to only transmissions received from the participants to the session. In addition, after repeating at least one of the control transmissions, the repeater sets a hang time having a duration that is determined based on a type of the transmission preceding the setting of the hang time.

9 Claims, 4 Drawing Sheets

METHOD AND DEVICE FOR CONTROLLING ACCESS TO A CHANNEL IN A CONVENTIONAL MULTI-SITE COMMUNICATION SYSTEM

TECHNICAL FIELD

The technical field relates generally to communication systems, and in particular, it relates to an infrastructure device controlling access to a channel in a conventional multi-site communication system.

BACKGROUND

Multi-site communication systems provide wide-area coverage for users of the system. These systems comprise a number of sites, with each site corresponding to a different geographic coverage area and each site having located therein an infrastructure device (which will hereinafter be referred to as a repeater) serving the coverage area by managing one or more channels in the coverage area. Accordingly, for purposes of the teachings herein, a site is characterized by a repeater that serves a particular coverage area, a channel for wireless communication device transmissions, and a system identification that identifies transmissions from the repeater on the channel at the site. Some or all of the infrastructure devices in a multi-site communication system may be networked or connected together via a backend network to provide the wide-area coverage via one or more logical wide-area channels, and in many instances two or more of the coverage areas have some degree of overlap.

Multi-site communication systems may be designed as trunked systems or conventional systems. In trunked systems, a limited number of communication channels are shared among a much larger number of users to facilitate efficient use of the system's communication resources. Thus, to afford each user a reasonable opportunity to use the system's resources, one or more control channels are utilized by the infrastructure to allocate the shared resources between the many users in the system. In general, when a wireless communication device (which will hereinafter be referred to as a radio) wants to communicate on the trunked system, it sends a request on the control channel to communicate with another radio or group of radios. In turn, the requesting radio (and the radios to which it desires to communicate) receives back on the control channel the allocation of a traffic channel to use for their communications. Upon the conclusion of the communications, the allocated channel is released for use by other radios in the system.

In conventional systems, a number of communication channels are also shared amongst a number of users (although the number of users per channel is typically much smaller than in trunked systems). However, there is no control mechanism provisioned in the infrastructure to allocate the resources among the users in the system. Thus, in contrast to a trunked system, each channel in a conventional system is dedicated to one or more groups of users enabling the users to control access to the channels through their radios by manually selecting a channel or selecting a talkgroup that is assigned a particular channel in order to start a communication session and transmit and receive media during the session.

In a conventional multi-site communication system where the repeaters are networked or coupled together, one of the repeaters may receive a transmission indicating a start of a first session and begin repeating the transmissions of that first session. The repeater will also notify other repeaters in the system to repeat the transmissions of the first session. However, due to timing lags in the backend network that connects the repeaters, one or more of the other repeaters may start repeating transmissions for a different session prior to receiving the notification for the first session. This is undesirable because for proper operation of the system, all of the repeaters should be repeating the transmissions of the same session so that all participants to the session can transmit and receive media during the session without interruption regardless of their location within the multi-site communication system.

It is known for the repeaters in a multi-site communication system to use an arbitration process, wherein the repeaters coordinate among each other which session will be provided access to a wide-area channel so that each repeater repeats transmissions for the same session and denies access to the wide-area channel for transmissions for a different session. However, a shortcoming is that the arbitration process is performed each time before repeating a transmission, which causes undesirable time delays in ongoing communications within the system.

Thus, there exists a need for a method for controlling access to a channel in a conventional multi-site communication system, which does not require a repeater to perform an arbitration before each repeated transmission.

BRIEF DESCRIPTION OF THE FIGURES

The accompanying figures, where like reference numerals refer to identical or functionally similar elements throughout the separate views, which together with the detailed description below are incorporated in and form part of the specification and serve to further illustrate various embodiments of concepts that include the claimed invention, and to explain various principles and advantages of those embodiments.

Figure 1:
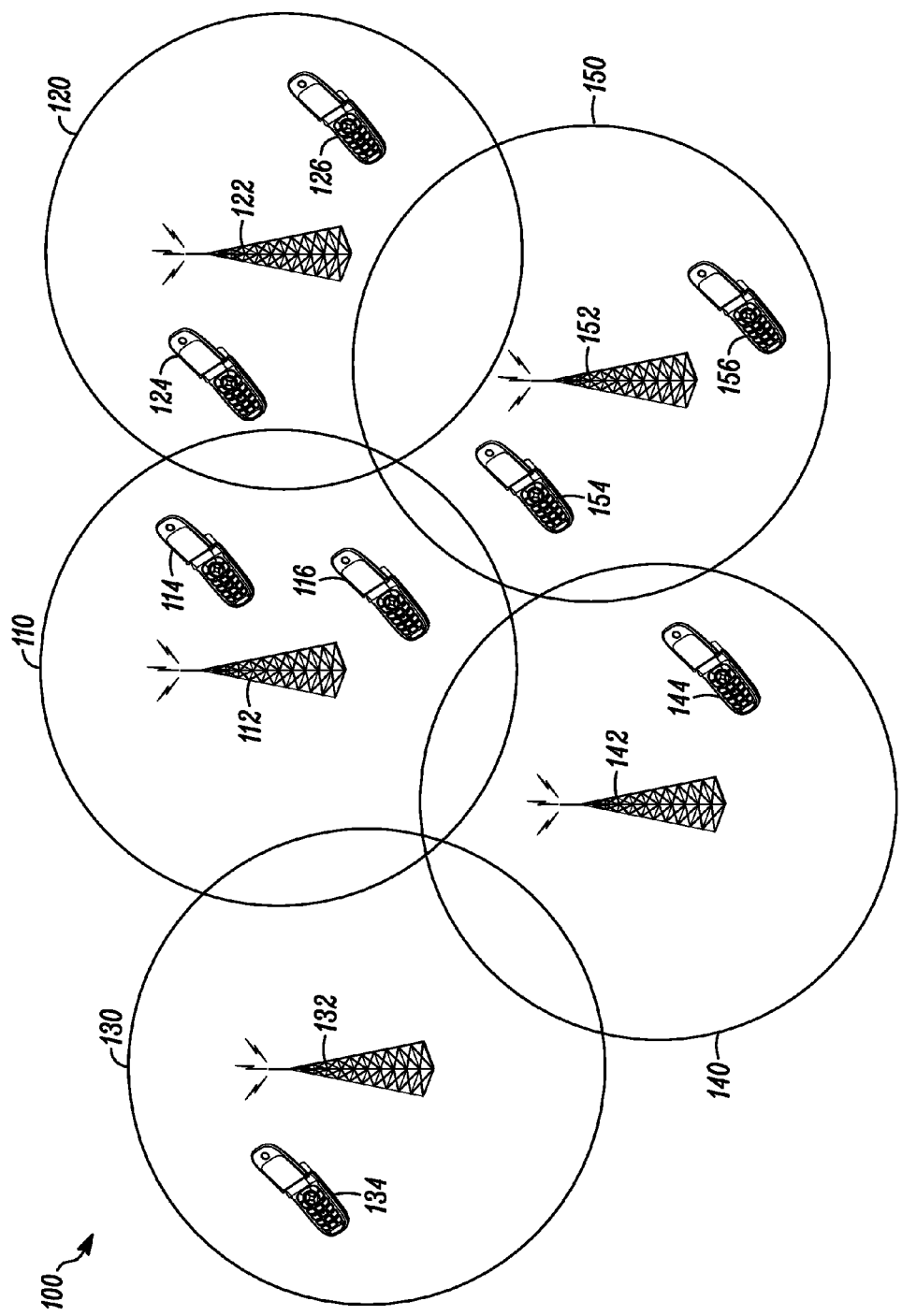
FIG. 1 is a block diagram of a wireless communication network in which may be implemented some illustrative embodiments.

Skilled artisans will appreciate that elements in the figures are illustrated for simplicity and clarity and have not necessarily been drawn to scale. For example, the dimensions of some of the elements in the figures may be exaggerated relative to other elements to help improve understanding of various embodiments. In addition, the description and drawings do not necessarily require the order illustrated. Apparatus and method components have been represented where appropriate by conventional symbols in the drawings, showing only those specific details that are pertinent to understanding the various embodiments so as not to obscure the disclosure with details that will be readily apparent to those of ordinary skill in the art having the benefit of the description herein. Thus, it will be appreciated that for simplicity and clarity of illustration, common and well-understood elements that are useful or necessary in a commercially feasible embodiment may not be depicted in order to facilitate a less obstructed view of these various embodiments.

DETAILED DESCRIPTION

Generally speaking, pursuant to the various embodiments, a repeater receives and repeats, on a multi-site channel, a sequence of control and media transmissions included in a session, wherein the session has a plurality of participants. While repeating these transmissions, the repeater further detects, from at least one of the transmissions, a start of the session and a type of the session. Based on the type of the session, the repeater determines whether to perform an arbitration during the session to control access to the multi-site channel, and restricts each performed arbitration to only transmissions received from the participants to the session. In addition, after repeating at least one of the control transmissions, the repeater sets a hang time having a duration that is determined based on a type of the transmission preceding the setting of the hang time.

By implementing the described embodiments, the repeaters in a conventional multi-site communication system provide a measure of resource guarantee to participants of a session while the session is ongoing by limiting any arbitrations performed to only the participants to the session or subsets of those participants. Embodiments further facilitate all repeaters in the system repeating transmissions from the same session. Moreover, during sessions, the frequency of performing arbitrations is decreased and the duration of some hangtimes is also decreased, which shortens the amount of time the resources are reserved for any given session. Those skilled in the art will realize that the above recognized advantages and other advantages described herein are merely illustrative and are not meant to be a complete rendering of all of the advantages of the various embodiments.

Referring now to the drawings and in particular to FIG. 1, a conventional wireless communication network 100 is depicted in which may be implemented some illustrative embodiments. Network 100 comprises sites 110, 120, 130, 140, and 150 each having a repeater located in a geographic coverage area as indicated by the circles drawn in the figure, wherein all of the repeaters in this illustrative embodiment are networked together via an IP backbone (not shown), and there is no central controller for the repeaters as is common in conventional systems. More particularly, site 110 includes a repeater 112 that manages at least one channel at site 1 10. Site 120 includes a repeater 122 that manages at least one channel at site 120. Site 130 includes a repeater 132 that manages at least one channel at site 130. Site 140 includes a repeater 142 that manages at least one channel at site 140. Site 150 includes a repeater 152 that manages at least one channel at site 150. Moreover, each site is associated with a different system identification such as a color code, a Network Access Code, a PL (private line) tone or a DPL (digital private line) word (but that will hereinafter be referred to as a color code) that uniquely identifies transmissions from the repeater at the site.

Further illustrated are radios 114 and 116 operating in site 1 10, radios 124 and 126 operating in site 120, radio 134 operating in site 130, radio 144 operating in site 140, and radios 154 and 156 operating in site 150. Since the radios are mobile, the radios and the repeaters communicate over an air interface using an air interface protocol that can be either standard or proprietary. One such standard is a Digital Mobile Radio (DMR) air interface standard, which specifies various protocols used by two-way radios (that can both transmit and receive signals) at the data link layer (i.e., layer 2) of the well known seven-layer Open Systems Interconnection computer networking model, and which is described in ETSI TS (Technical Specification) 102 361-1 v1.4.5 (2007-12) published by European Telecommunication Standards Institute (ETSI). The ETSI DMR standard specifies a two-slot Time Division Multiple Access (TDMA) structure that transmitting and receiving devices can utilize to send voice and/or data signals. The voice and data signals are transmitted in the TDMA slots in accordance with a general burst format specified in the standard. However, any other proprietary or standard air interface protocols could be used in network 100.

In addition, the radios and repeaters can communicate information over a channel using any modulation scheme including, but not limited to, TDMA (having any slotting structure), Frequency Division Multiple Access (FDMA), Code Division Multiple Access (CDMA), Orthogonal Frequency-Division Multiple Access (OFDMA), to name a few. As such, those skilled in the art will recognize and appreciate that the specifics of this example are merely illustrative of some embodiments and that the teachings set forth herein are applicable in a variety of alternative settings. Thus, since the teachings described do not depend on the environment, they can be applied to any type of wireless communication network or system having any number sites, repeaters and radios, wherein the radios communicate via a multi-site channel and the repeaters use an arbitration process to control access to the multi-site channel.

Referring again to FIG. 1, each repeater and radio is at least equipped with a transceiver (i.e., transmitter and receiver apparatus), a memory and a processing device and is further equipped with any additional components as needed for a commercial embodiment. The transceiver, memory and processing device can have any suitable physical implementation and are topologically coupled depending on the particular device implementation. These components are further operatively coupled and can be adapted, arranged, configured, and designed to perform methods in accordance with the teachings herein, for example, as illustratively described by reference to FIG. 2 through FIG. 6.

As referred to herein, a radio includes, but is not limited to, devices commonly referred to as wireless communication devices, access terminals, mobile radios, mobile stations, subscriber units, user equipment, mobile devices, or any other device capable of operating in a wireless environment, and are referred to hereinafter simply as radios. Examples of radios include, but are not limited to, two-way radios, mobile phones, cellular phones, Personal Digital Assistants (PDAs), laptops and two-way pagers. As used herein, a repeater is a device that is a part of a fixed network infrastructure and can receive information (either control or media, e.g., data, voice (audio), video, etc.) in a signal from a radio and transmit information in signals to one or more radios via a communication link. A repeater includes, but is not limited to, equipment commonly referred to as infrastructure devices, base radios, base stations, base transceiver stations, access points, routers or any other type of infrastructure equipment interfacing a wireless communication device in a wireless environment, and is referred to hereinafter simply as a repeater.

As mentioned earlier, the devices in network 100 communicate using communication links (also referred to herein as channels). The channels are the physical communication resources over which information is sent between the devices within network 100 and can comprise wired links or wireless links. If the channels comprise wireless links, the corresponding physical resource is an allocation of radio spectrum that is partitioned into radio frequency (RF) carriers that are modulated by a media or control stream. The repeater at each site manages the communication resources (i.e., the physical channel) in its geographic area by determining which radio transmissions it will repeat at any given time.

As it relates to the embodiments described herein, the terms communication and transmission refer to messages emanating from one device, which may include media or control information. More particularly, a transmission is defined as one or more related discreet units of media information or one or more related discreet units of control information sent from a single device. The particular type of discreet unit of information sent in the system depends on the protocols being used. For example, in TDMA systems, the burst is the smallest standalone unit of information sent in the system, and a transmission can include one or more related bursts. Accordingly, a voice transmission can include several bursts containing voice that a user spoke into a radio microphone in between the time the user pressed a push-to-talk (PTT) button on the radio and when the user released the PTT button. In other system implementations, a transmission may comprise, for instance, one or more packets of control or media information, one or more datagrams of control or media information, one or more blocks of control or media information, etc.

Moreover, a media (or content) transmission is defined as a transmission that contains media information that is intended for viewing or listening by a user in the system and includes, for instance, audio (voice), data, video, etc. Whereas, a control transmission is defined as a transmission that contains non-media information including, but not limited to, signaling to establish or manage connections in the system, call setup information, location information, etc. The term call is defined as one or more related media transmissions between two or more devices during a communication session. A communication session, or simply session, is defined as a sequence of related transmissions between two or more devices permitted to participate in the session. The session begins with one or more control transmissions followed by a call and ends as a result of some action or inaction by one of the session participants or by the repeater, which is repeating the session transmissions; and the time gap between each transmission in the session is less than the time required to set up the communication resources for the session.

In addition, since the repeaters are networked together, a physical channel managed by each repeater is coupled together to form a "wide-area channel" (also referred to herein as a "multi-site channel") on which radios at different sites can hear the same transmissions. Embodiments of the teachings herein are directed to a method performed by a repeater for controlling access to the wide-area channel so that all repeaters in the system are repeating transmissions from the same session, wherein the use of the arbitration process is minimized during the session.

Figure 2:
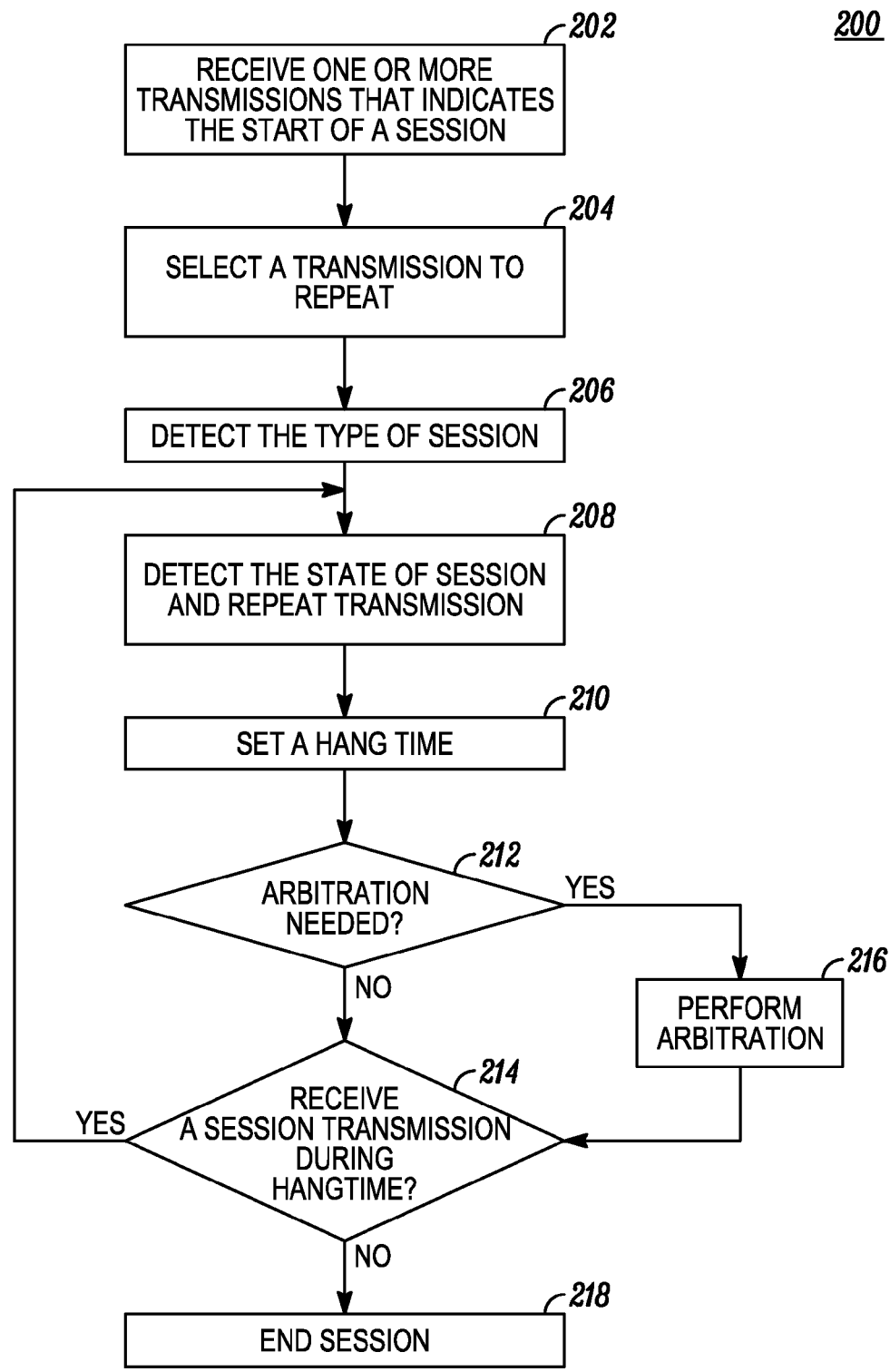
FIG. 2 is a flow diagram of a method for controlling access to a channel in accordance with an illustrative embodiment.

FIG. 2 is a flow diagram of a method 200 performed by a repeater for controlling access to a channel, which in this case comprises a multi-site channel communication resource, in accordance with an illustrative embodiment. To better facilitate understanding of the concepts herein, FIG. 2 will be described as being performed by a single one of the repeaters in system 100 (e.g., repeater 112), although all repeaters in the system that contribute resources to the multi-site channel are performing method 200. In addition, FIG. 2 is described in conjunction with the illustrative sessions of transmission sequences 300, 400, 500, and 600, shown, respectively, in FIGS. 3 through 6. Accordingly, in performing method 200, repeater 112 receives (202) a transmission and detects the start of a session from this transmission. If repeater 112 is not already repeating transmissions for a different session and since other sessions may be starting within a short time interval, the repeater performs an arbitration process to control access to the multi-site channel by selecting (204) a transmission to repeat that facilitates all repeaters in the system repeating transmissions for the same session.

Such receipt and detection of the transmission is performed by the repeater's receiver demodulating and decoding the transmission using any suitable demodulation and decoding techniques and the repeater's processor determining based on the type of transmission, for instance, that a session is starting. For example, certain control transmissions indicate the start of a session including, but not limited to, a valid voice or data header transmission, a preamble transmission, or a Control Signaling Block (CSBK) transmission, wherein the CSBK is used to check the availability of the target device before sending media transmissions. Accordingly, repeater 112 can detect the start of a session from a single transmission in certain cases. However, in an alternative implementation, the repeater determines that a session is starting from several transmissions, such as in the case of a late entry to a session, wherein the repeater misses the initial header for the session and recreates the header from information detected in several transmissions. In one illustrative example, repeater 112 reconstructs a voice header from Link Control (LC) information in bursts B through E of a voice superframe and detects the start of a session from the reconstructed voice header.

Figure 3:
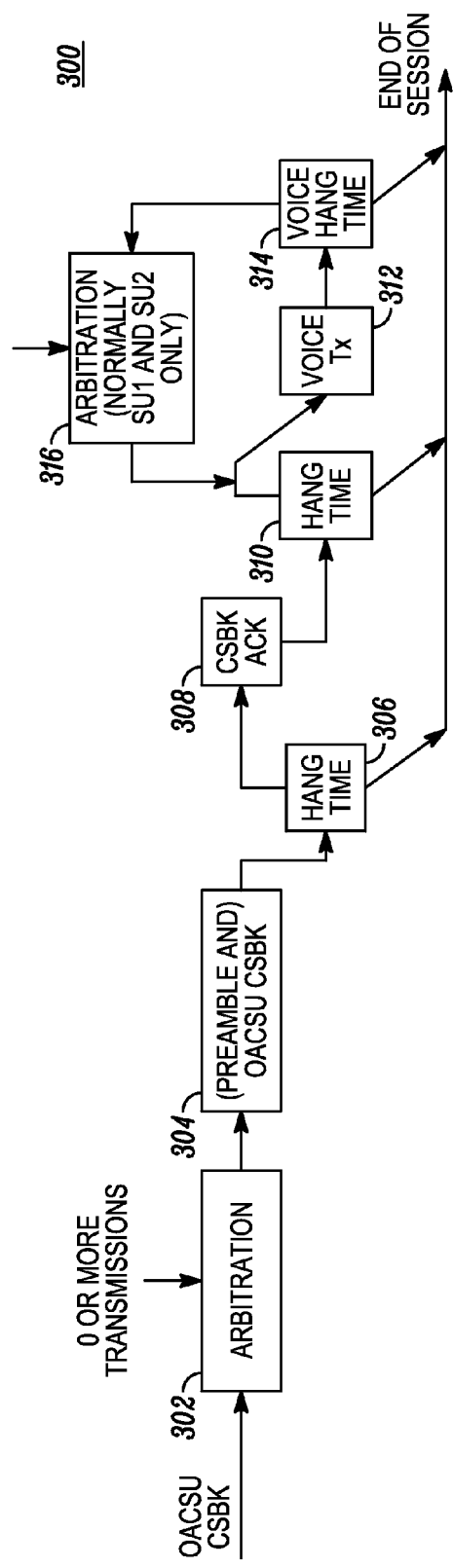
FIG. 3 is an illustrative individual voice call sequence modified by a repeater using the method shown in FIG. 2.
Figure 4:
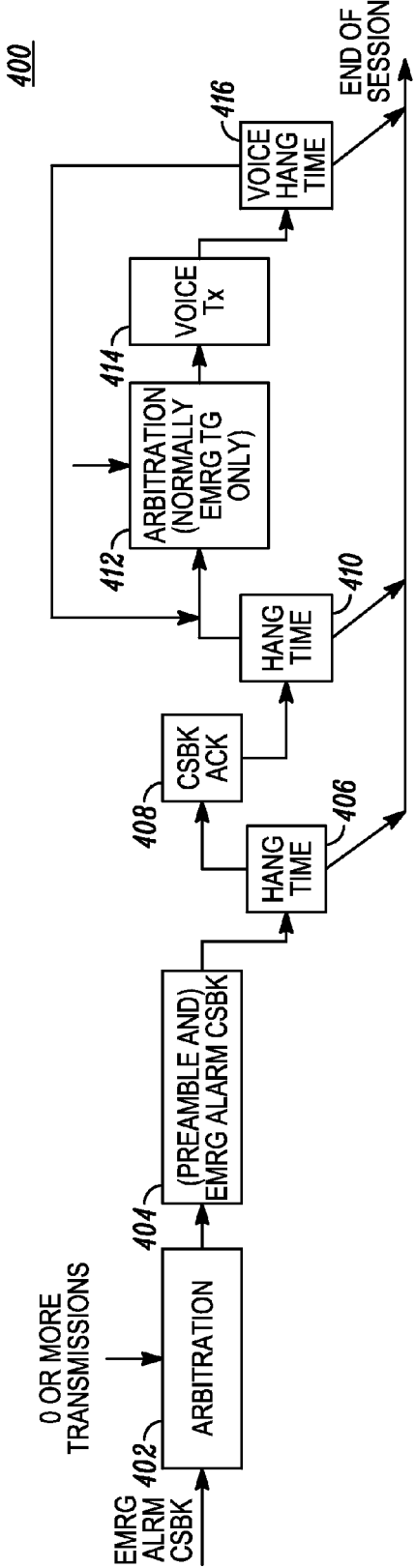
FIG. 4 is an illustrative emergency voice call sequence modified by a repeater using the method shown in FIG. 2.
Figure 5:
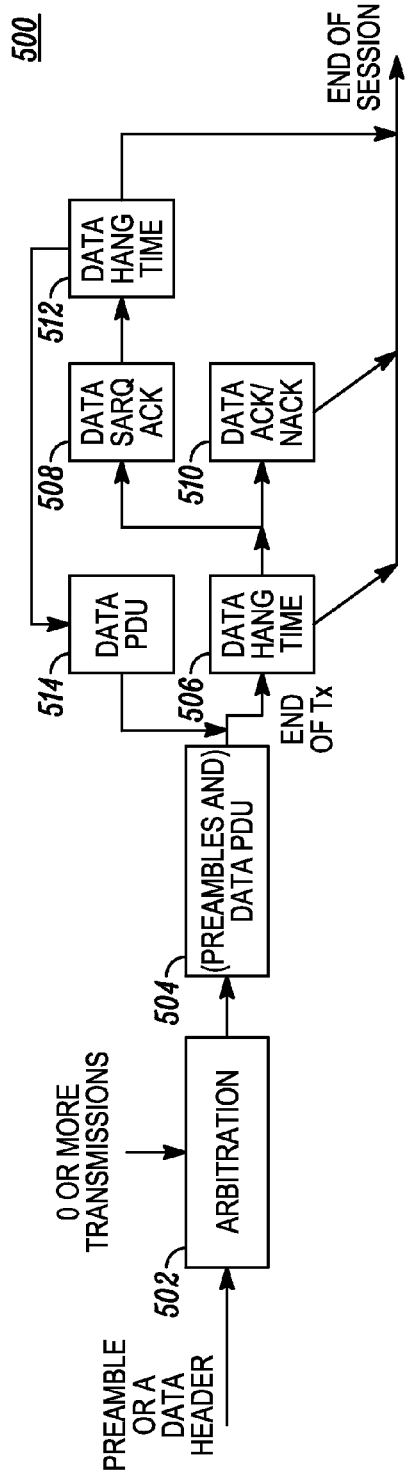
FIG. 5 is an illustrative individual data call sequence modified by a repeater using the method shown in FIG. 2.
Figure 6:
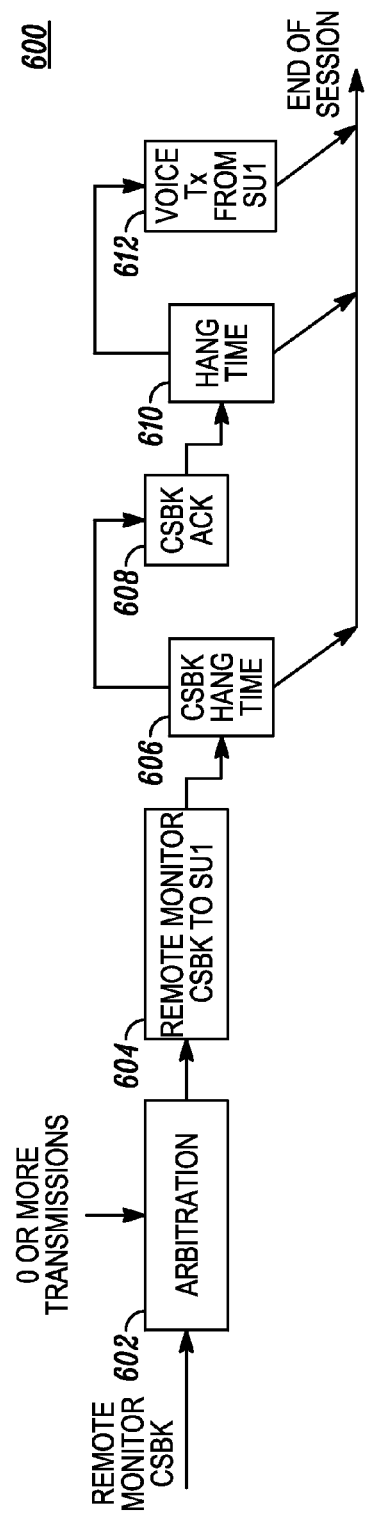
FIG. 6 is an illustrative remote monitor call sequence modified by a repeater using the method shown in FIG. 2.

As illustratively shown in FIG. 3, repeater 112 receives an Off Air Call Set-Up (OACSU) CSBK that indicates the start of a session and may receive zero or more other transmissions that indicate the start of a session. Receiver 112 performs an arbitration (302) and selects the OACSU CSBK to repeat (304). In FIG. 4, repeater 112 receives an Emergency Alarm CSBK that indicates the start of a session and may receive zero or more other transmissions that indicate the start of a session. Receiver 112 performs an arbitration (402) and selects the Emergency Alarm CSBK to repeat (404). In FIG. 5, repeater 112 receives a preamble or data header that indicates the start of a session and may receive zero or more other transmissions that indicate the start of a session. Receiver 112 performs an arbitration (502) and selects the preamble or data header to repeat (504). In FIG. 6, repeater 112 receives a Remote Monitor CSBK that indicates the start of a session and may receive zero or more other transmissions that indicate the start of a session. Receiver 112 performs an arbitration (602) and selects the Remote Monitor CSBK to repeat (604).

During the arbitration process, all of the repeaters wait a predetermined time interval that is long enough to enable the repeaters to receive transmissions that are propagating through the backend network, which indicate that another repeater has received a transmission indicating the start of a different session. An illustrative time interval for the arbitration is about 120 ms. If the repeaters receive such transmissions from other repeaters during the arbitration, they will all select (204) the same transmission to repeat using a selection algorithm. The selection algorithm may comprise, for example, all transmissions being assigned a random number by the repeater that received the transmission over the air, and the repeaters all selecting the transmission having the highest or lowest random number. Other selection algorithms may be used within the scope of the teachings herein. If no transmissions are received from other repeaters over the backend, repeater 112 could select (204) the transmission received earliest in time to repeat and inform the other repeaters of its selection.

As mentioned above, repeater 112 can detect the start of a session between two or more participants to the session from a single transmission. Repeater 112 can also determine (206, 208) the type of the session, the state of the session, and the participants to the session from the selected transmission alone or in conjunction with one or more subsequent transmissions that the repeater receives during the session. The participants to the session are provided through addressing contained in the header and/or addressing contained in subsequent transmissions such as in voice superframes.

Regarding the type of session, for example if repeater 112 receives a voice header or voice preamble, it knows that a voice type session is starting or if it receives a data header or data preamble, it knows that a data type session is starting. That a voice type session is starting can also be detected, in one illustrative implementation, from a CSBK, e.g., the OACSU CSBK (FIG. 3), the Remote Monitor CSBK (FIG. 6), and the Emergency Alarm CSBK (FIG. 4). The Emergency Alarm CSBK also provides further illustration of a control transmission that indicates that the session starting is of an emergency type.

Based on the type of transmission, repeater 112 further determines a state of the session. As described above, the repeater may determine from a selected transmission the beginning or start state of the session. The transmission may further indicate that the session is in a state of call set-up. Examples of such transmissions include certain control transmissions and corresponding acknowledgement (ACKs) to the transmissions, such as for instance a CSBK and corresponding CSBK ACK. In addition, the repeater detects that the session is in a call state each time that it receives a media transmission.

With knowledge of the session type, transmission type, session state, and session participants, repeater 112 repeats (208) the selected transmission and sets (210) a hangtime, which is a duration of time in which the repeater keeps the multi-site channel allocated for the on-going session, and also determines (212) whether to perform an arbitration after repeating the transmission. If no arbitration is performed, repeater 112 determines (214) whether another transmission has been received before expiration of the hangtime. If an arbitration is needed, the repeater performs (216) the arbitration while waiting to receive the next session transmission. If no additional transmission is received during the hangtime, the repeater assumes that the session has ended (218) and releases the multi-site channel communication resource for use by the next set of radios. If another transmission for the session is received during the hangtime, the repeater continues method 200 at 208, wherein it detects the state of the session from the transmission, repeats the transmission, sets the hangtime, determines whether to perform an arbitration, and waits for the next transmission for the session.

More particularly with respect to setting the hangtime, repeater 212 no longer always sets the hangtime to have the same duration. By contrast, in accordance with the teachings herein, repeater 112 looks at the type of transmission preceding the hangtime to dynamically set the duration of the hangtime. This is because the type of the preceding transmission determines a minimum amount of time required by the target device(s) to process the transmission and reply. The duration of the hangtime must be at least equal to this minimum amount of time. For example, the time required by the data link layer of a target device to process a data transmission and respond with an ACK or NACK is smaller than the time required for a target device to receive a voice transmission and respond with its own voice transmission. Therefore, in the above scenario the repeater sets a smaller hangtime after repeating the data transmission than the hangtime that it sets after repeating the voice transmission.

Regarding whether to perform an arbitration, repeater 112 no longer performs an arbitration each time after repeating a transmission. Instead, in accordance with the teachings herein, repeater 112 looks at the session type and the state within the session to determine whether to perform an arbitration because this gives an indication to the repeater of the number of devices from which it can expect a response transmission. If based on the type of session and the state within the session, the repeater expects a transmission from only one device, the repeater does not perform an arbitration. This is the case for sessions that include either voice or data calls but only one session participant is expected to send a response transmission during a given state of the session. For example, during call set-up for an individual voice call where an initiating radio sends a CSBK to a target radio, when the repeater repeats the CSBK it does not perform an arbitration because it only expects an ACK transmission response from a single radio, the target radio. Moreover, using this approach, for some sessions the repeater does not perform an arbitration at all throughout the course of the entire session. For example, at each state during a session including an individual data call, the repeater expects a response transmission from only a single radio and therefore does not perform any arbitrations during the session.

By contrast, repeater 112 performs an arbitration when the state of the session, e.g., based on the type of the immediately preceding transmission, provides an expectation of receipt of a next transmission during the session from two or more participants to the session. This is the case, for example, during the call state of a session that includes a voice call. Even during an individual call, both participants to the call might send a voice transmission, so the repeater performs an arbitration after each voice transmission.

Another aspect of the teachings herein is that repeater 112 restricts the arbitrations performed during the session to only transmissions received from participants to the session, which in some cases may include only a subset of the participants. In this manner, some measure of guarantee of the call is given to the session participants by preserving the multi-channel resource for the sole use of the session participants while their session is active, without interruption from users of other radios. However, it should be noted that in another embodiment, restricting the arbitrations to the session participants does not prohibit repeater 112 from allocating the multi-site channel resource to start a higher priority session, such as a session comprising an emergency call.

FIGS. 3 through 6 provide some illustrative examples of how repeater 112 can dynamically adjust hangtime duration and selectively perform restricted arbitrations in accordance with the teachings herein. FIG. 3 illustrates a session 300 for an individual voice call between participant radios SU1 and SU2 to the session. After the arbitration 302, session 300 includes a call set-up comprising repeating the OACSU CSBK (and perhaps a preamble) 304 from the initiating participant, setting a hangtime 306, repeating a CSBK ACK 308 that was expected from the only target participant, and setting a hangtime 310 in anticipation of the start of the voice call between SU1 and SU2. During the voice call, repeater 112 repeats any voice transmission 312 received before expiration of a hangtime 314 that it sets after each voice transmission that it repeats. During the voice call, repeater 112 also performs an arbitration 316 after each repeated voice transmission 312, which it restricts to include only voice transmissions received from SU1 and SU2. Session 300 ends when repeater 112 fails to receive a session transmission before expiration of any hangtime.

As can be seen, in this illustrative example, repeater 112 does not perform an arbitration during call set-up because after each call set-up transmission (e.g., the OACSU CSBK transmission 304 and the CSBK ACK transmission 308), the repeater expects a reply transmission from a single participant. Arbitration is performed only during the actual voice call, wherein the repeater could receive voice transmissions from either SU1 or SU2 and would therefore need to decide which radio to grant the communication resource. Moreover, repeater 112 sets the hangtimes 310 and 314, respectively, before and during the call state to have a longer duration than the hangtime 306 set during the call set-up state. This is because the voice transmissions sent during the hangtime 310 and 314 require more processing time to create and transmit than do the CSBK ACK 308 sent during hangtime 306.

FIG. 4 illustrates a session 400 for an emergency call between two or more participant radios to the session. After the arbitration 402, session 400 includes a call set-up comprising repeating the Emergency Alarm CSBK (and perhaps a preamble) 404 from the initiating participant, setting a hangtime 406, repeating a CSBK ACK 408 received from a target participant(e.g., in an implementation having two or more target participants, a known designated target participant can send the CSBK ACK or the repeater can repeat the first CSBK ACK received from any of the target recipients), and setting a hangtime 410 in anticipation of the start of the voice call between the participants. During the voice call, repeater 112 repeats any voice transmission 414 received before expiration of a hangtime 416 that it sets after each voice transmission that it repeats. During the voice call, repeater 112 also performs an arbitration 412 after each repeated voice transmission 414, which it restricts to include only voice transmissions received from the participants to the session 400. Session 400 ends when repeater 112 fails to receive a session transmission before expiration of any hangtime.

As can be seen, in this illustrative example, repeater 112 does not perform an arbitration during call set-up because after each call set-up transmission (e.g., the Emergency Alarm CSBK transmission 404 and the CSBK ACK transmission 408), the repeater expects to repeat a reply transmission from only a single participant. Arbitration is performed only during the actual voice call, wherein the repeater could receive voice transmissions from any of the participants and would therefore need to decide which radio would to grant the communication resource. Moreover, repeater 112 sets the hangtimes 410 and 416, respectively, before and during the call state to have a longer duration than the hangtime 406 set during the call set-up state. This is because the voice transmissions sent during the hangtime 410 and 416 require more processing time to create and transmit than do the CSBK ACK 408 sent during hangtime 406.

FIG. 5 illustrates a session 500 for an individual data call between two participant radios to the session. After the arbitration 502, session 500 includes the data call comprising repeating a data preamble and Packet Data Unit (PDU) 504 from the initiating participant, setting a hangtime 506, and if the PDU was successfully received or the PDU was completely unsuccessfully received by the target participant, repeating, respectively, an ACK or NACK 510, wherein the session 500 terminates. However, during the data call, if the PDU was partially received, repeater 112 repeats one or more Selective Automatic Repeat Request (SARQ) ACKs 508, sets a hangtime 512, and repeats the entire or portions of the PDU 514. Session 500 further ends if repeater 112 fails to receive a session transmission before expiration of hangtime 512. During session 500, repeater 112 performs no arbitrations because at each state of the call, the repeater expects a transmission from only one session participant. Moreover, the hangtimes 506 and 512 can be set to have the same or a similar duration (with perhaps the hangtime 512 being slightly longer) but that is shorter as compared to say the duration of hangtime 310 or 314 because it takes a shorter amount of time for the target device to process the data PDU and to send an ACK, NACK, or SARQ ACK.

FIG. 6 illustrates a session 600 for a remote monitor call from an initiating participant radio (that could be a subscriber unit or a command center, for instance) to a single participant radio SU1 to the session. After the arbitration 602, session 600 includes the call set-up comprising the repeater 112 repeating the Remote Monitor CSBK 604 from the initiating participant, setting a hangtime 606, repeating a CSBK ACK 608 from the target participant, and setting a hangtime 610 in anticipation of the start of the voice call, which comprises a single voice transmission 612 from the target device which ends the session. Session 600 further ends if repeater 112 fails to receive a session transmission before expiration of hangtime 610. During session 500, repeater 112 performs no arbitrations because at each state of the call, the repeater expects a transmission from only one session participant. Moreover, repeater 112 sets the hangtime 610 to have a longer duration than the hangtime 606 set during the call set-up state. This is because the voice transmission sent during the hangtime 610 requires more processing time to create and transmit than does the CSBK ACK 608 sent during hangtime 606.

In the foregoing specification, specific embodiments have been described. However, one of ordinary skill in the art will appreciate that various modifications and changes can be made without departing from the scope of the invention as set forth in the claims below. Accordingly, the specification and figures are to be regarded in an illustrative rather than a restrictive sense, and all such modifications are intended to be included within the scope of present teachings. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has", "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not, without more constraints, preclude the existence of additional identical elements in the process, method, article, or apparatus that comprises, has, includes, contains the element. The terms "a" and "an" are defined as one or more unless explicitly stated otherwise herein. The terms "substantially", "essentially", "approximately", "about" or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed. Also, the sequence of steps in a flow diagram or elements in the claims, even when preceded by a letter does not imply or require that sequence.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

We claim:

1. A method for controlling access to a channel:
at a repeater in a conventional multi-site communication system:
detecting, on a channel managed by the repeater, a start of a session between a plurality of participants;
determining a type of the session;
based on the type of the session, determining whether to perform an arbitration during the session to control access to the channels, and restricting each performed arbitration to only transmissions received from the participants to the session.

2. The method of claim 1 further comprising:
upon receiving and repeating at least one control transmission in the session, setting a hang time having a duration that is determined based on a type of the transmission preceding the setting of the hang time.

3. The method of claim 1 further comprising determining a state of the session, wherein an arbitration is performed only when the state of the session provides an expectation of receipt of a next transmission during the session from two or more of the participants.

4. The method of claim 3, wherein an arbitration is performed only when the state of the session provides an expectation of receipt of a voice transmission from two or more of the participants during the session.

5. The method of claim 4, wherein the session comprises at least one of an individual voice call, an emergency voice call, or a remote monitor call.

6. The method of claim 1, wherein no arbitration is performed during the session.

7. The method of claim 6, wherein the session comprises an individual data call.

8. The method of claim 1, wherein the type of the session is determined from at least one of a received preamble transmission, a received header transmission, a Control Signaling Block (CSBK) transmission, a voice transmission, or a data transmission.

9. An infrastructure device for controlling access to a channel, the device comprising:
a transceiver receiving and repeating, on a multi-site channel, a sequence of control and media transmissions comprising a session, wherein the session has a plurality of participants; and
a processing device coupled to the transceiver for:
detecting, from at least one of the transmissions, a start of the session and a type of the session;
based on the type of the session, determining whether to perform an arbitration during the session to control access to the multi-site channel, and restricting each performed arbitration to only transmissions received from the participants to the session; and
after repeating at least one of the control transmissions, setting a hang time having a duration that is determined based on a type of the transmission preceding the setting of the hang time.

* * * * *

UNITED STATES PATENT AND TRADEMARK OFFICE
CERTIFICATE OF CORRECTION

PATENT NO.         : 8,078,209 B2
APPLICATION NO.    : 12/253353
DATED              : December 13, 2011
INVENTOR(S)        : Chowdhary et al.

Page 1 of 1

It is certified that error appears in the above-identified patent and that said Letters Patent is hereby corrected as shown below:

In Column 3, Line 39, delete "1 10." and insert -- 110. --, therefor.

In Column 3, Line 52, delete "1 10," and insert -- 110, --, therefor.

Signed and Sealed this
Eighteenth Day of December, 2012

David J. Kappos
*Director of the United States Patent and Trademark Office*